UNITED STATES PATENT OFFICE.

JONATHAN SHERMAN, JR., OF CHICAGO, ILL., ASSIGNOR, BY MESNE ASSIGNMENTS, TO AMERICAN PRESSED TAN BARK COMPANY, OF NEW JERSEY.

PREPARATION OF TAN-BARK FOR TRANSPORTATION

SPECIFICATION forming part of Reissued Letters Patent No. 10,211, dated September 26, 1882.

Original No. 182,965, dated October 3, 1876. Application for reissue filed September 5, 1881.

*To all whom it may concern:*

Be it known that I, JONATHAN SHERMAN, Jr., of Chicago, in the county of Cook and State of Illinois, have invented an Improved Process of Preparing Tanning-Bark for Shipment, of which the following is a specification.

This invention relates to the preparation of tanning-bark so as to be ready for tanners' use, and yet will not be bulky or liable to waste by shipping; and it consists in drying, grinding, and compressing the bark into bricks of any desirable shape on or near the spot where it is gathered.

Heretofore the bark was shipped to the tanners in its natural shape, as it was scaled off of the oak and hemlock trees, either single or compressed in layers, which, by their irregularity and spongy property, are very bulky for shipment, and quite a percentage had to be allowed for waste in loading and unloading, all which I prevent by drying, grinding, and pressing the bark into suitable cakes of brick or prismatic shapes.

Such compressed ground bark the tanner will break into pieces, which, in steeping in water, will swell and easily come apart, and will save to him the trouble of grinding or cutting the same himself, and by the means of such compression the cells of the bark containing the tannin are extended and broken, which admits the water to come more freely in contact with it. Thus the tanner will save a large percentage of the strength of the barks over the ordinary mode of now doing it.

Having thus described my invention, what I claim as new, and desire to secure by Letters Patent, is—

The process for the preparation of bark for tanning, consisting in drying and grinding and then compressing the bark sufficiently to crush the cells containing tannin, and at the same time to form small cakes of the ground material convenient for transportation.

JONATHAN SHERMAN, JR.

Witnesses:

JNO. C. MACGREGOR,

GEO. R. CUTLER.